United States Patent
Roy et al.

(10) Patent No.: US 8,614,998 B2
(45) Date of Patent: *Dec. 24, 2013

(54) METHOD AND SYSTEM FOR INTEGRATION OF TRUNKING AND CONVENTIONAL LAND MOBILE RADIO SYSTEMS

(75) Inventors: Arindam Roy, Plano, TX (US); Jeffery E. Benshetler, Plano, TX (US)

(73) Assignee: E.F. Johnson Company, Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/346,038

(22) Filed: Jan. 9, 2012

(65) Prior Publication Data

US 2012/0106485 A1 May 3, 2012

Related U.S. Application Data

(63) Continuation of application No. 12/171,445, filed on Jul. 11, 2008, now Pat. No. 8,094,563.

(60) Provisional application No. 60/950,869, filed on Jul. 19, 2007.

(51) Int. Cl.
*H04L 12/66* (2006.01)
*H04W 4/00* (2009.01)

(52) U.S. Cl.
USPC .......................................... 370/338; 370/256

(58) Field of Classification Search
USPC ................. 370/327, 338, 342–349, 465–468, 370/478–480, 356, 89; 455/422.1, 455/424–426.2, 446–448
See application file for complete search history.

(56) References Cited

U.S. PATENT DOCUMENTS

| | | | |
|---|---|---|---|
| 6,161,016 A | 12/2000 | Yarwood | |
| 7,596,194 B2 | 9/2009 | Janky | |
| 7,889,846 B2 * | 2/2011 | Beard et al. | 379/88.01 |
| 8,094,563 B2 * | 1/2012 | Roy et al. | 370/237 |
| 8,126,494 B2 * | 2/2012 | Shaffer et al. | 455/520 |
| 2005/0037794 A1 | 2/2005 | Namm et al. | |
| 2005/0277383 A1 * | 12/2005 | Reid | 455/15 |
| 2007/0072554 A1 | 3/2007 | Janky | |
| 2008/0207260 A1 | 8/2008 | Dent | |
| 2009/0175209 A1 | 7/2009 | Roy et al. | |
| 2010/0177661 A1 * | 7/2010 | Dailey | 370/254 |
| 2011/0263288 A1 | 10/2011 | Korus et al. | |
| 2012/0002588 A1 | 1/2012 | Roy et al. | |
| 2012/0039201 A1 | 2/2012 | Roy et al. | |

* cited by examiner

*Primary Examiner* — Thai Hoang
(74) *Attorney, Agent, or Firm* — Gardere Wynne Sewell LLP

(57) ABSTRACT

An integrated Land Mobile Radio (LMR) system enables communication between a trunking LMR system and a conventional LMR system. The trunking LMR system includes a trunking site controller including a first network gateway router. The trunking LMR system includes at least one trunking control channel and a plurality of trunking traffic channels. The trunking traffic channels each are assigned to a specific trunking LMR subscriber by the trunking site controller to enable the trunking LMR subscribers to communicate with one another. The conventional LMR system includes a conventional site controller including a second network gateway router connected to the first network gateway router by a data network. The conventional LMR system includes a plurality of conventional traffic channels. The conventional traffic channels are each assigned to a specific conventional LMR subscriber by the conventional site controller to enable the conventional LMR subscribers to communicate.

28 Claims, 3 Drawing Sheets

METHOD AND SYSTEM FOR INTEGRATION OF TRUNKING AND CONVENTIONAL LAND MOBILE RADIO SYSTEMS

CROSS-REFERENCE TO RELATED APPLICATIONS

Pursuant to 35 U.S.C. §120, this continuation application claims priority from, and hereby incorporates by reference for all purposes, copending U.S. patent application Ser. No. 12/171,445, entitled METHOD AND SYSTEM FOR INTEGRATION OF TRUNKING AND CONVENTIONAL LAND MOBILE RADIO SYSTEMS, naming Arindam Roy and Jeffery E. Benshetler as inventors, filed Jul. 11, 2008, which pursuant to 35 U.S.C. §119 (e), claims the benefit of and incorporates by reference for all purposes, U.S. Provisional Patent Application Ser. No. 60/950,869, entitled INTEGRATION OF TRUNKING AND CONVENTIONAL LAND MOBILE RADIO SYSTEMS naming Arindam Roy and Jeffery E. Benshetler as inventors, and filed Jul. 19, 2007.

TECHNICAL FIELD OF THE INVENTION

The invention relates generally to communication systems. More specifically, but not by way of limitation, the invention relates to a method and system for integration of trunking and conventional land mobile radio (LMR) systems.

BACKGROUND OF THE INVENTION

LMR systems are deployed by organizations requiring instant communication between geographically dispersed and mobile personnel. Typical users of LMR systems include police departments, fire departments, medical personnel, EMS and the military.

Current LMR systems can be configured to provide for radio communications between a site and subscriber units in the field. A subscriber unit may be a mobile unit or a portable unit. LMR systems can be as simple as two subscriber units communicating between themselves and a site over preset channels, or they can be complex consisting of hundreds of subscriber units and multiple sites.

LMR systems can be broadly divided into two classes: (1) trunking LMR systems; and (2) conventional LMR systems. A trunking system generally includes of one or more trunking sites and dispatch control centers. FIG. 1 illustrates a typical trunking LMR system 100 including a trunking site 104 and a dispatcher 108. The trunking site 104 includes a control channel 112 and one or more traffic channels (e.g., 116, 118). Typically a group of mobile users (e.g., 124, 128) creates a user group to communicate with each other and the dispatcher 108. In a trunking system 100 there can be multiple mobile users and multiple user groups. When a mobile user wants to contact other mobile users or a dispatcher in the same user group, the mobile user sends a request to a trunking site controller 132 through the control channel 112. The trunking site controller 132 contacts the other trunking sites interested in the same user group. The trunking site controller in each interested site allocates an available traffic channel. Once a channel is available, the mobile users in the user group is notified through the control channel and the mobile users move to the traffic channel to communicate with each other. Since a traffic channel is allocated dynamically on a per call basis, a trunking system provides higher utilization of a traffic channel. However, since a channel is not dedicated to a user group, a user may need to wait for a traffic channel when there is no available traffic channel.

The trunking LMR system 100 is generally suitable for high density areas where there is a likelihood of collision caused by multiple radios vying for a traffic channel. The control channel 112 is used to avoid collision by allocating available traffic channels to the radios.

FIG. 2 illustrates a conventional LMR system 200. Like the trunking system 100, the conventional LMR system 200 may include one or more conventional sites, although only one conventional site 204 and a dispatcher 208 is shown in FIG. 2. However, unlike the trunking site 104, the conventional site 204 does not include a control channel. The conventional site 204 includes a plurality of traffic channels, 216, 220, 224, each traffic channel being typically assigned to one or more user groups (e.g., 228, 232). The members of a user group may communicate with each other on the same traffic channel, thus allowing the users and the dispatcher to instantly communicate with each other without waiting for the system to allocate a traffic channel. However, the channel utilization is low in the conventional system 200 since multiple user groups may compete for channel usage on a particular traffic channel while a different traffic channel may be free to use.

In the conventional site 204, a mobile user presses a push to talk button and immediately starts talking All mobile users and dispatchers in the same user group immediately hear the call. If multiple users key up at the same time, the calls are lost because of collision. Consequently, the conventional LMR system 200 is generally suitable in rural areas with low traffic density where in some cases only one channel may be available.

Thus, both the trunking LMR system 100 and the conventional LMR system 200 allow the mobile users to communicate via the traffic channel within their user groups. For example, the police radio 124 and the police radio 128 in the trunking LMR system 100 can communicate within their specific user group over a traffic channel assigned on a per call basis. Likewise, the police radio 228 and the ambulance radio 232 in the conventional LMR system 200 can communicate within their specific user groups over a traffic channel. However, if a police radio from a trunking LMR system needs to communicate with a police user group from a conventional LMR system, the dispatcher must patch the call to enable the two similar user groups to communicate. Since the dispatcher needs to patch the call to allow the police radio from the trunking LMR system to communicate with the police radio from the conventional LMR system, the reliability of such communication is degraded due to the reliance on the dispatcher. Also, the dispatchers generally use an analog 4-wire interface for patching the communication between the trunking LMR and conventional LMR systems, which is not scalable and provide limited flexibility of deployment.

SUMMARY OF THE DISCLOSURE

An integrated Land Mobile Radio (LMR) system enables seemless communication between a trunking land mobile radio (trunking LMR) system and a conventional land mobile radio (conventional LMR) system. The trunking LMR system includes a trunking site controller including a first network gateway router. The trunking LMR system includes at least one trunking control channel connected to the trunking site controller. The trunking control channel is configured to enable communication among the trunking site controller and one or more trunking LMR subscribers. The trunking LMR system includes a plurality of trunking traffic channels connected to the trunking site controller. The trunking traffic channels each are assigned to a specific trunking LMR user group by the trunking site controller on a call by call basis to enable the trunking LMR subscribers to communicate with one another. The trunking site controller uses the trunking control channel to allocate the trunking traffic channels among the trunking LMR subscribers. The conventional LMR system includes a conventional site controller including a second network gateway router connected to the first network gateway router by a data network. The conventional LMR system includes a plurality of conventional traffic channels connected to the conventional site controller. The conventional traffic channels are each assigned to a specific conventional LMR user group(s) by the conventional site controller to enable the conventional LMR subscribers to communicate. The second gateway router packetizes voice signals originating from conventional LMR subscribers into conventional LMR data packets and routes the conventional LMR data packets to the first gateway router. The first gateway router routes the conventional LMR data packets to the intended trunking LMR subscribers. The first gateway router packetizes voice signals originating from trunking LMR subscribers into trunking LMR data packets and routes the trunking LMR data packets to the second gateway router. The second gateway router routes the trunking LMR data packets to the intended conventional LMR subscribers.

BRIEF DESCRIPTION OF THE DRAWINGS

For a more complete understanding of the features, example embodiments and possible advantages of the present invention, reference is now made to the detailed description of the invention along with the accompanying figures and in which.

DETAILED DESCRIPTION OF THE INVENTION

In one embodiment, a system and method integrates trunking and conventional Land Mobile Radio (LMR) systems to enable communication between the trunking and conventional LMR systems. Through a distributed gateway (e.g., software) installed in both trunking LMR and conventional LMR sites, the gateway enables inter site communication by packetizing voice signals into voice packets and routing the voice packets to intended subscribers.

Figure 1:
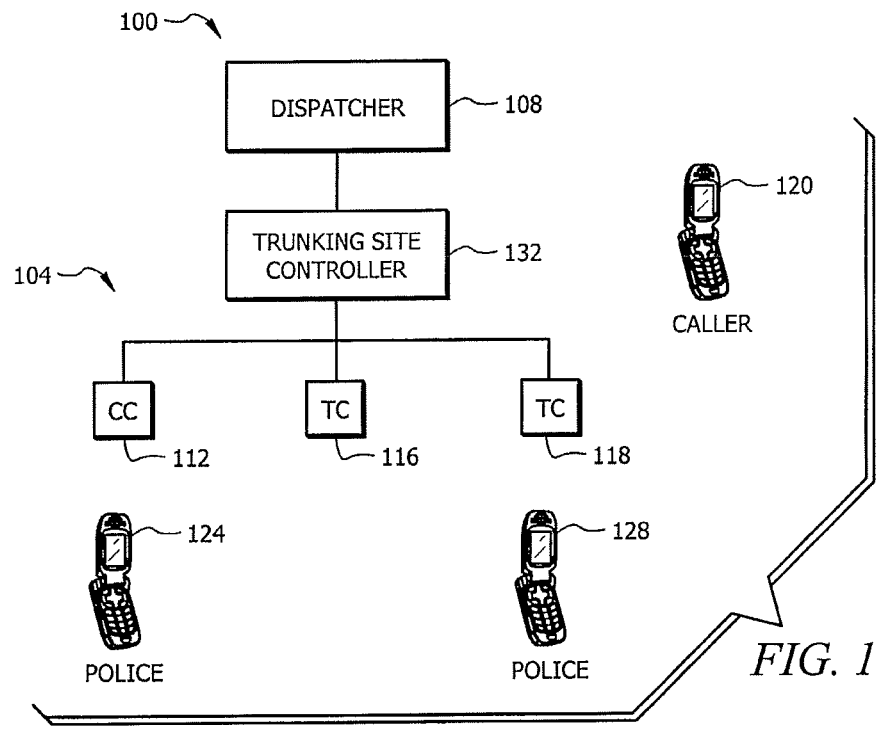
FIG. 1 illustrates an existing trunking LMR system.
Figure 2:
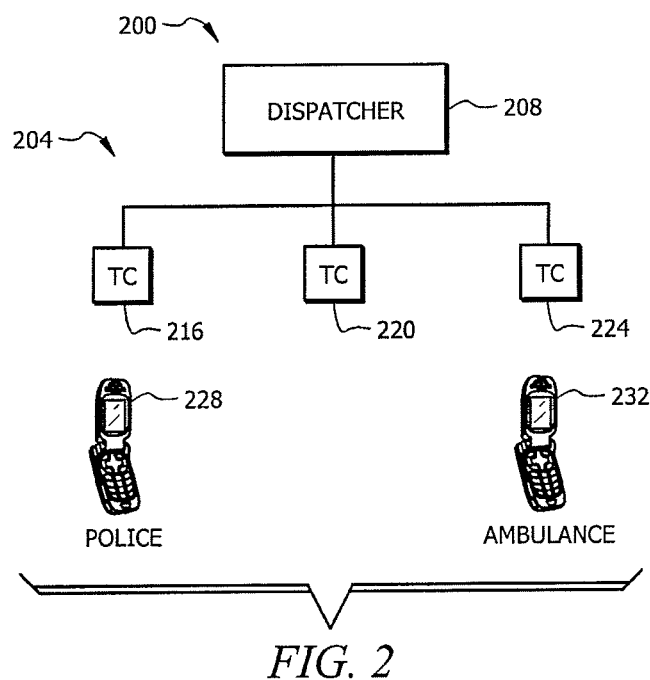
FIG. 2 illustrates an existing conventional LMR system.
Figure 3:
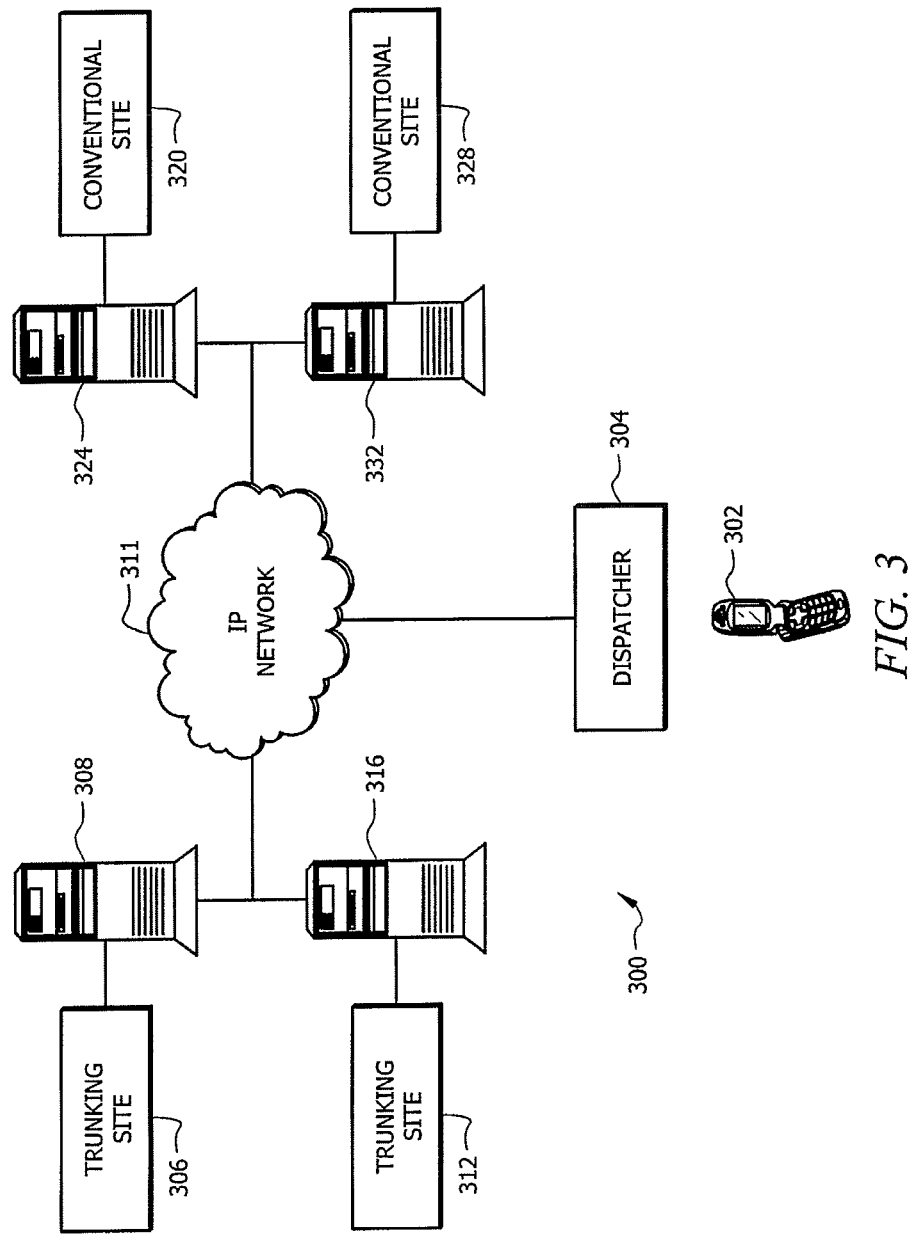
FIG. 3 illustrates a system for integrating a trunking and a conventional LMR system in accordance with one embodiment.

FIG. 3 illustrates a system 300 for integrating a trunking and a conventional LMR system in accordance with one embodiment. The system 300 includes a dispatcher 304 that may receive a call from a caller 302 from a specific user group. The dispatcher 304 is connected to a communication network such as an IP network 311. The system 300 includes trunking sites 306 and 312 and conventional sites 320 and 328. The sites each are connected to a respective gateway software, 308, 316, 324 and 332, and each gateway is connected to the IP network 311. Each gateway acts as a respective site controller. The gateways convert voice signals into voice packets and route the voice packets to intended subscribers. Since intersite communication occurs via voice packets, the gateways communicate with one another as peers. In order to coordinate assistance to the caller 302, it may be necessary for the trunking site 306 to communicate with the conventional site 328. For example, a voice signal originating at the trunking site 306 is converted into voice packets by the gateway 308. The voice packets are routed over the IP network 311 to the intended destination. In this example, the IP network 311 routes the voice packets to the gateway 332, which reconstitutes the voice signal and forwards the voice signal to the conventional site 328, the intended destination.

Figure 4:
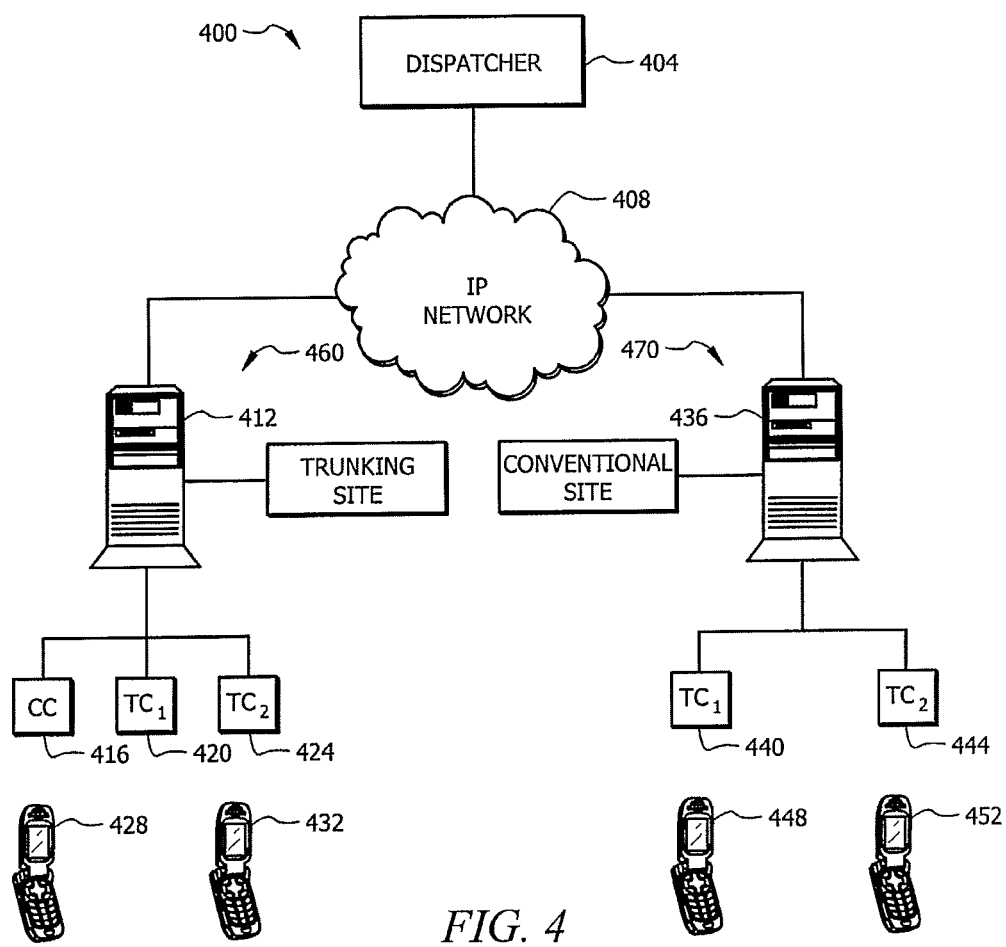
FIG. 4 illustrates a detailed embodiment of an integrated system enabling communication between a trunking LMR system and a conventional LMR system.

FIG. 4 illustrates an embodiment of an integrated system 400 enabling communication between a trunking LMR system 460 and a conventional LMR system 470. The trunking LMR system 460 includes a site controller such as a gateway 412, a control channel 416 and traffic channels 420 and 424. The gateway 412 functions as a site controller communicating with subscriber radios 428 and 432 over the control channel 416 to assign or allocate the traffic channels 420 and 424 among the subscriber radios 428 and 432. Thus, the gateway 412 prevents collision by assigning an available traffic channel to a requesting subscriber radio. In one embodiment, the gateway 412 is an IP router that is configured to convert voice signals into voice packets and route the voice packets over an IP network 408.

The conventional LMR system 470 includes a site controller such as a gateway 436 and traffic channels 440 and 444. As will be understood by those skilled in the art, the conventional LMR system 470 operates without a control channel. The gateway 436 forwards voice packets originating from the trunking LMR system 460 to one of the subscribers 448, 452 over one of the traffic channels 440, 444. A voice signal originating from the subscriber 448 or 452 is received by the gateway 436 over one of the traffic channels 440, 444. The gateway 436 converts the voice signal into voice packets which are routed to the gateway 412 over the IP network 408. The gateway 412 reconstitutes the voice packets into voice signal and forwards the voice signal to the intended subscriber radio over one of the traffic channels (420, 424).

A caller 428 seeking assistance places a call on user group, which is received by the gateway 412. The gateway 412 sets up the call locally and contacts the gateway 436 on the conventional site 470 and the dispatcher 404. The gateway 436 converts the call originating from the trunking site to a conventional call and delivers the call to the conventional users 448 and 452. When the conventional users 448 and 452 respond back, the gateway 436 converts the call to an IP call and sets it up with the gateway 412. The gateway 412 then converts the call to a trunking call and delivers the call to the intended recipients.

If the caller 428 (e.g., a police radio) within the trunking LMR system 460 needs to communicate with a police radio (e.g., 448) or an ambulance radio (e.g., 452) within the conventional LMR system 470, communication may occur seamlessly over the IP network 408. For example, a voice signal originating from the police radio (e.g., 448) is converted into voice packets and routed by the gateway 412 over the IP network 408 to the gateway 436. The voice packets are reconstituted into a voice signal and the gateway transmits the voice signal to the police radio (e.g., 448). Thus, the system 400 enables seamless communication between the trunking LMR system 460 and the conventional LMR system 470.

As will be appreciated, the system 400 is easily scalable since additional trunking or conventional LMR systems may be added to the IP network 408. In one embodiment, the voice packets are multicasted by the gateways over the IP network 408, thus decreasing bandwidth requirement. In one embodiment, the gateway 412 includes a trunking channel map reflecting if a trunking channel is busy or available.

It will be appreciated that different edge devices can be added to the system 400. Since the system 400 utilizes an IP protocol for communication, various cellular and PSTN devices can be connected to the system 400. For example, one or more cellular and PSTN devices can be connected to the IP network 408, allowing these edge devices (e.g., cellular and PSTN devices) to seamlessly communicate with the mobile users via the gateways.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An integrated Land Mobile Radio (LMR) communication system, comprising:
   at least one trunking land mobile radio (trunking LMR) system, comprising:
      a trunking site controller,
      at least one trunking control channel operable to enable communication between the trunking site controller and one or more trunking LMR subscribers, and
      one or more trunking traffic channels,
      wherein said trunking site controller is operable in combination with said at least one trunking control channel to allocate at least one of said one or more trunking traffic channels to a trunking LMR subscriber on a per call basis to enable said trunking LMR subscriber to communicate; and
   at least one conventional land mobile radio (conventional LMR) system, comprising:
      a conventional site controller in communication with said trunking site controller over a data network, and
      one or more conventional traffic channels in communication with said conventional site controller,
      wherein said conventional site controller is operable to assign at least one of said one or more conventional traffic channels to a conventional LMR user group to enable said conventional LMR user group to communicate.

2. The integrated LMR communication system as set forth in claim 1, wherein during a call, the conventional site controller is operable to packetize voice signals originating from a conventional LMR subscriber into conventional LMR data packets, and to route said conventional LMR data packets to the trunking site controller.

3. The integrated LMR communication system as set forth in claim 2, wherein the trunking site controller is operable to route said conventional LMR data packets to one or more trunking LMR subscribers participating in the call.

4. The integrated LMR communication system as set forth in claim 1, wherein during a call, the trunking site controller is operable to packetize voice signals originating from a trunking LMR subscriber into trunking LMR data packets, and to route said trunking LMR data packets to the conventional site controller.

5. The integrated LMR communication system as set forth in claim 4, wherein the conventional site controller is operable to route said trunking LMR data packets to one or more conventional LMR subscribers participating in the call.

6. The integrated LMR communication system as set forth in claim 1, wherein the data network is an IP network.

7. The integrated LMR communication system as set forth in claim 1, wherein the trunking site controller comprises a first network gateway router, and the conventional site controller comprises a second network gateway router.

8. The integrated LMR communication system as set forth in claim 7, wherein the first and second network gateway routers enable communication between one or more trunking LMR subscribers and one or more conventional LMR subscribers.

9. The integrated LMR communication system as set forth in claim 1, wherein at least one of the trunking site controller and the conventional site controller is operable to multicast LMR data packets.

10. The integrated LMR communication system as set forth in claim 1, further comprising a trunking traffic channel map reflecting status of the trunking channels, the trunking traffic channel map enabling the trunking site controller to allocate available trunking channels among trunking LMR subscribers.

11. The integrated LMR communication system as set forth in claim 1, further comprising a dispatch console operable to receive a call originating from a trunking LMR subscriber and a call originating from a conventional LMR subscriber, wherein the dispatch console is further operable to forward the call originating from the trunking LMR subscriber to the conventional LMR site controller, and further operable to forward the call originating from the conventional LMR subscriber to the trunking LMR site controller.

12. An integrated Land Mobile Radio (LMR) communication system, comprising:
   at least one trunking land mobile radio (trunking LMR) system including a trunking site controller operable to communicate with one or more trunking traffic channels; and
   at least one conventional land mobile radio (conventional LMR) system including a conventional site controller operable to communicate with the trunking site controller and one or more conventional traffic channels;
   wherein the trunking site controller is further operable to route data received from the conventional site controller to one or more trunking LMR subscribers through one or more of the one or more trunking traffic channels, and wherein the conventional site controller is further operable to route data received from the trunking site controller to one or more conventional LMR subscribers through one or more of the one or more conventional traffic channels.

13. The integrated LMR communication system of claim 12, wherein the data received from the conventional site controller comprises voice signal data and the data received from the trunking site controller comprises voice signal data.

14. The integrated LMR communication system of claim 12, wherein the trunking site controller is operable to packetize data originating from one or more of the trunking LMR subscribers into LMR data packets and forward the LMR data packets to the conventional site controller.

15. The integrated LMR communication system of claim 12, wherein the conventional site controller is operable to packetize data originating from one or more of the conventional LMR subscribers into LMR data packets and forward the LMR data packets to the trunking site controller.

16. The integrated LMR communication system of claim 12, further comprising a trunking control channel operable to communicate with the trunking site controller, wherein the trunking control channel is further operable to enable communication between the trunking site controller and one or more of the one or more trunking LMR subscribers.

17. The integrated LMR communication system of claim 12, further comprising a trunking control channel operable to communicate with the trunking site controller to allocate one or more of the trunking traffic channels to one or more of the trunking LMR subscribers.

18. The integrated LMR communication system of claim 12, further comprising an IP network interconnecting the trunking site controller and the conventional site controller.

19. The integrated LMR communication system of claim 12, wherein the trunking site controller and the conventional site controller multicast the data.

20. The integrated LMR communication system of claim 12, further comprising a trunking traffic channel map reflecting status of the trunking channels, the trunking traffic channel map enabling the trunking site controller to allocate available trunking channels among the trunking LMR subscribers.

21. The integrated LMR communication system of claim 12, further comprising a dispatch console operable to receive a call originating from a trunking LMR subscriber and a call originating from a conventional LMR subscriber, wherein the dispatch console is further operable to forward the call originating from the trunking LMR subscriber to the conventional site controller, and further operable to forward the call originating from the conventional LMR subscriber to the trunking site controller.

22. The integrated LMR communication system of claim 12, further comprising a plurality of edge devices connected to at least one of the trunking site controller and the conventional site controller.

23. The integrated LMR communication system of claim 12, wherein the trunking site controller comprises a first network gateway router.

24. The integrated LMR communication system of claim 12, wherein the conventional site controller comprises a second network gateway router.

25. A method for communicating between a trunking land mobile radio (trunking LMR) system and a conventional land mobile radio (conventional LMR) system using an IP network, the trunking LMR system including a trunking site controller operable to communicate with one or more trunking LMR subscribers, and the conventional LMR system including a conventional site controller operable to communicate with one or more conventional LMR subscribers, the method comprising:
    transmitting a trunking voice signal from a trunking LMR subscriber to the trunking site controller;
    routing the trunking voice signal to the conventional site controller over the IP network as trunking voice data;
    transmitting the trunking voice data to one or more conventional LMR subscribers;
    transmitting a conventional voice signal from a conventional LMR subscriber to the conventional site controller;
    routing the conventional voice signal to the trunking site controller over the IP network as conventional voice data; and
    transmitting the conventional voice data to one or more trunking LMR subscribers.

26. The method of claim 25, wherein the trunking voice signal is transmitted over a trunking traffic channel, and the conventional voice signal is transmitted over a conventional traffic channel.

27. The method of claim 25, further comprising multicasting the trunking voice data using the trunking site controller, and multicasting the conventional voice data using the conventional site controller.

28. The method of claim 25, wherein at least one of the trunking site controller and the conventional site controller communicate with one or more edge devices, and wherein the edge devices are cellular devices and PSTN devices connected to the at least one of the trunking site controller and the conventional site controller via the IP network.

\* \* \* \* \*